US008769262B2

(12) United States Patent
Nagata

(10) Patent No.: US 8,769,262 B2
(45) Date of Patent: Jul. 1, 2014

(54) VPN CONNECTION SYSTEM AND VPN CONNECTION METHOD

(75) Inventor: Atsushi Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 638 days.

(21) Appl. No.: 12/714,651

(22) Filed: Mar. 1, 2010

(65) Prior Publication Data

US 2011/0060902 A1 Mar. 10, 2011

(30) Foreign Application Priority Data

Mar. 2, 2009 (JP) ................................. 2009-048625

(51) Int. Cl.
*H04L 9/32* (2006.01)
(52) U.S. Cl.
USPC ........... 713/155; 713/168; 713/169; 713/170; 713/171; 713/153; 726/15; 726/2; 726/27; 726/29; 726/26; 709/249

(58) Field of Classification Search
USPC .......... 713/155, 201, 169, 170, 171; 709/249; 726/2, 15, 26, 27, 29
See application file for complete search history.

(56) References Cited

U.S. PATENT DOCUMENTS

| 7,072,962 | B2 * | 7/2006 | Hori ............................... 709/224 |
| 7,650,500 | B2 * | 1/2010 | Matoba ......................... 713/163 |
| 8,149,722 | B2 * | 4/2012 | Mera et al. ..................... 370/248 |
| 8,201,221 | B2 * | 6/2012 | Kitani et al. ...................... 726/4 |
| 8,286,002 | B2 * | 10/2012 | Kamat et al. .................. 713/192 |
| 8,352,372 | B1 * | 1/2013 | Swix et al. ....................... 705/56 |
| 2003/0101253 | A1 * | 5/2003 | Saito et al. ..................... 709/223 |
| 2007/0130457 | A1 * | 6/2007 | Kamat et al. ................... 713/151 |
| 2007/0250632 | A1 * | 10/2007 | Nomura et al. ............... 709/227 |
| 2007/0280247 | A1 * | 12/2007 | Mera et al. ..................... 370/392 |
| 2009/0316709 | A1 * | 12/2009 | Polcha et al. ................. 370/401 |

FOREIGN PATENT DOCUMENTS

| CN | 1581118 A | 2/2005 |
| CN | 1855807 A | 11/2006 |
| CN | 101047599 A | 10/2007 |
| JP | 2004280595 A | 10/2004 |
| JP | 2005311507 A | 11/2005 |
| JP | 2008177729 A | 7/2008 |
| WO | 2005004418 A1 | 1/2005 |
| WO | 2006011464 A | 2/2006 |

OTHER PUBLICATIONS

Japanese Office Action for JP2009-048625 mailed on Nov. 29, 2012.
Chinese Office Action for CN Application No. 201010123096.2 issued on Apr. 28, 2013 with English Translation.

* cited by examiner

*Primary Examiner* — Mohammad A Siddiqi
(74) *Attorney, Agent, or Firm* — Sughrue Mion, PLLC

(57) ABSTRACT

For establishing a VPN connection in the call-back type, a VPN server establishes an always-on connection through a unique protocol different from the electronic mail delivery system. A client generates a client authentication data used for the client authentication implemented by the VPN server, and establishes the relay server through the unique protocol to transmit the client authentication data. The relay server device relays the client authentication data to the VPN server through the unique protocol. The VPN server implements the client authentication based on the relayed data. The VPN server establishes the VPN connection with the client based on the result of the authentication.

18 Claims, 17 Drawing Sheets

Fig. 3

|   | DESTINATION DEVICE IDENTIFICATION INFORMATION | DESTINATION CONNECTION INFORMATION |
|---|---|---|
| 1 | 0 0 0 3 | CONNECTION 1 |
| 2 | 0 0 3 3 | CONNECTION 2 |
|   | ... | ... |
|   | ... | ... |

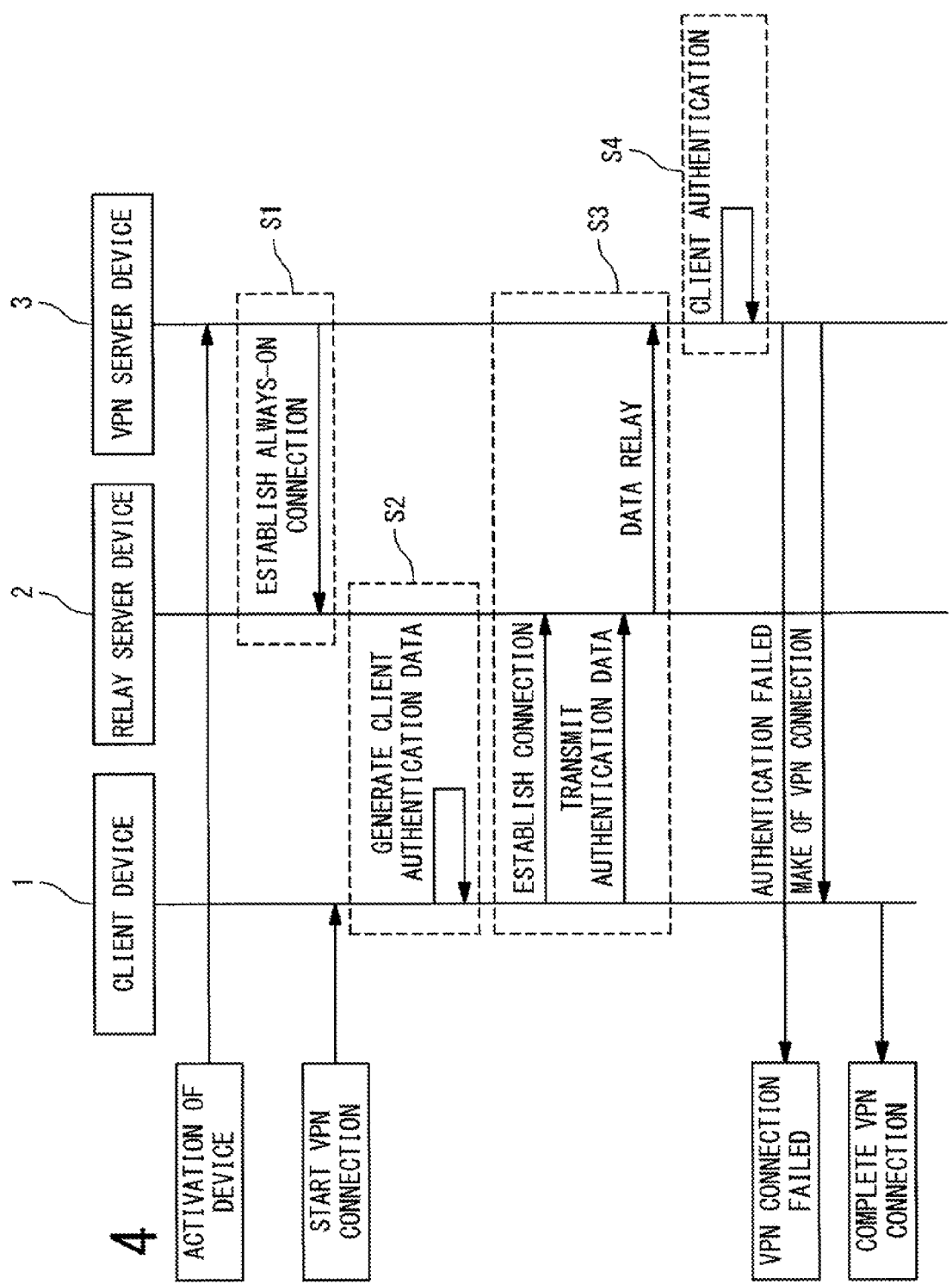

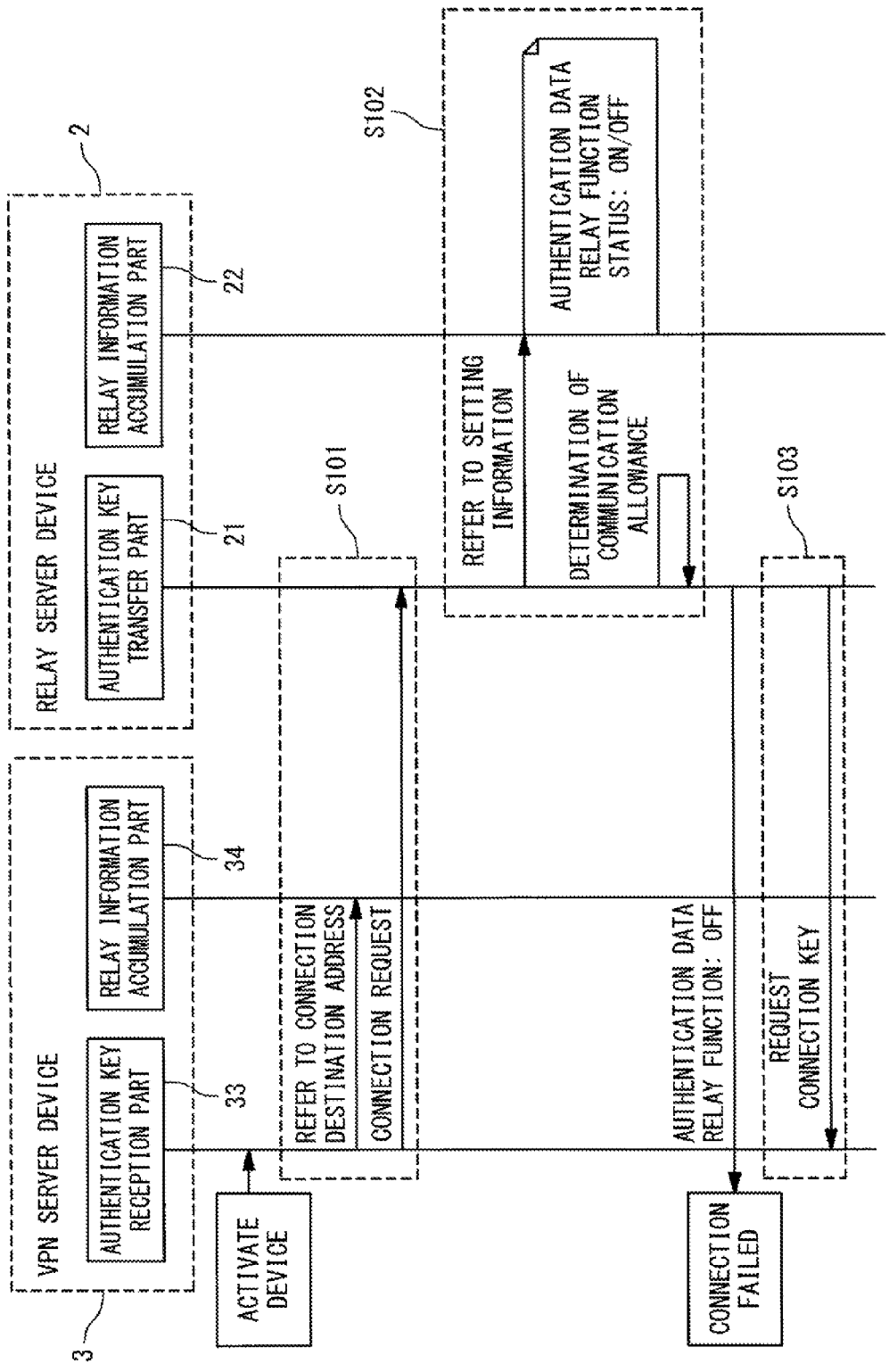

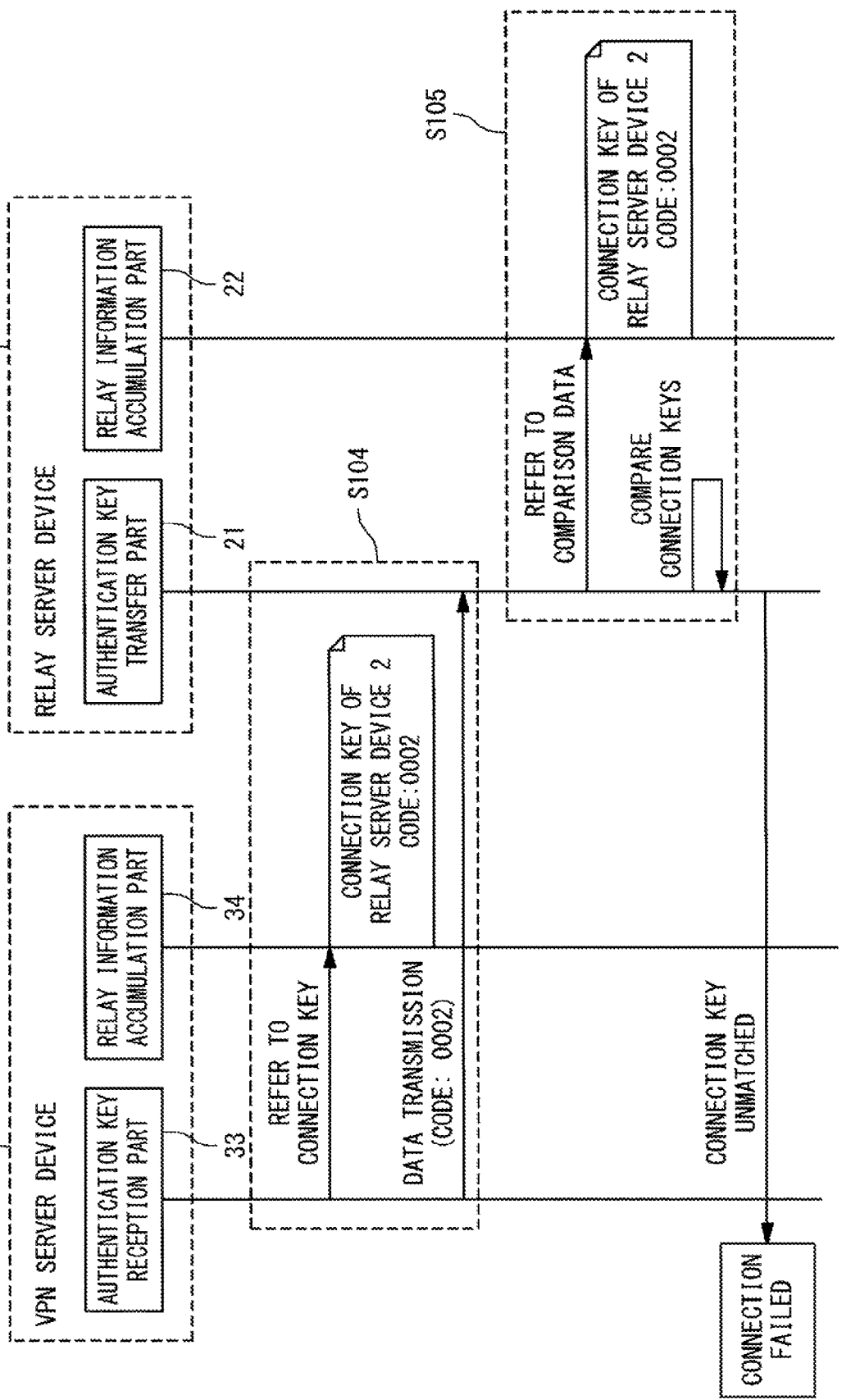

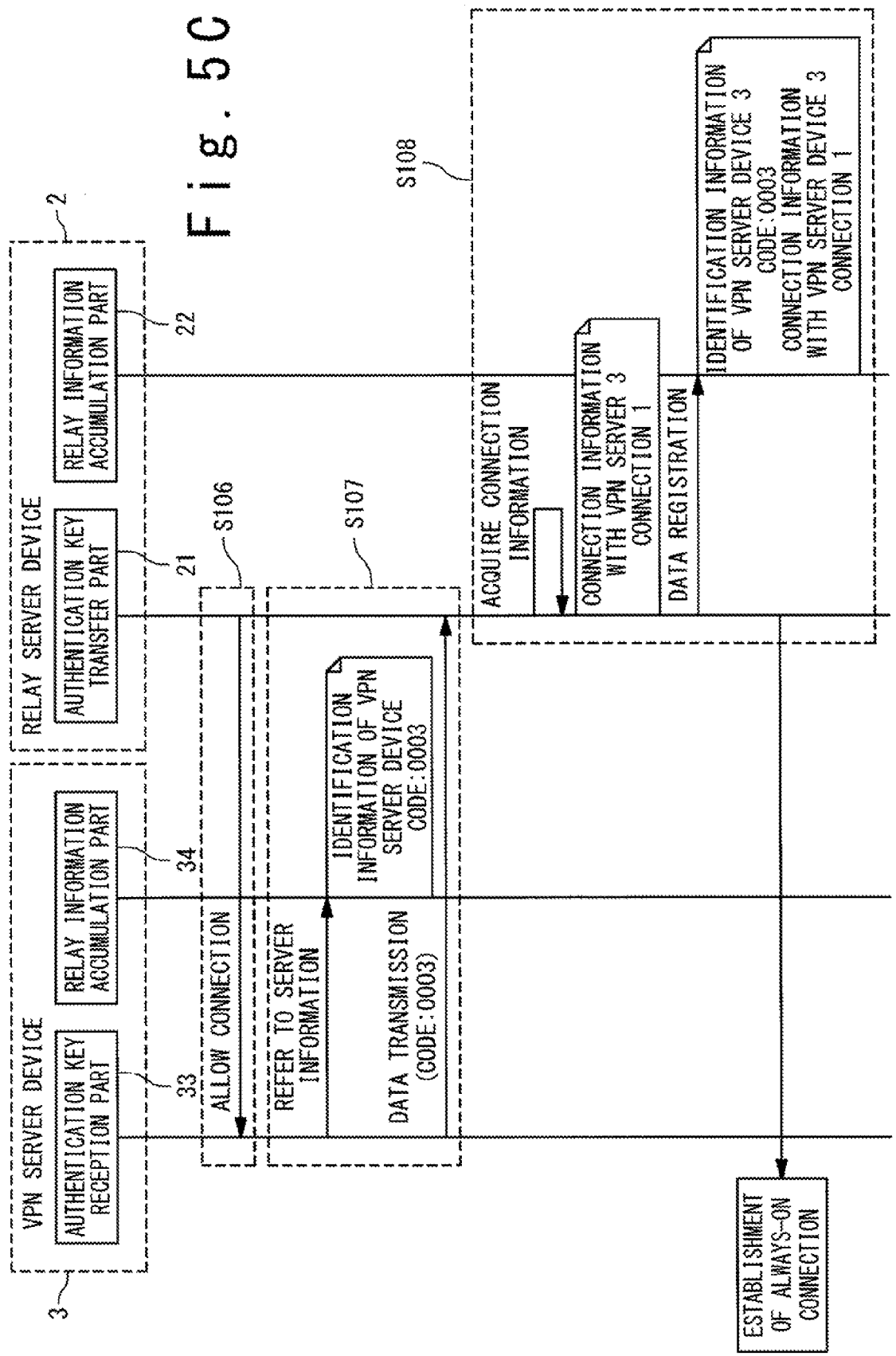

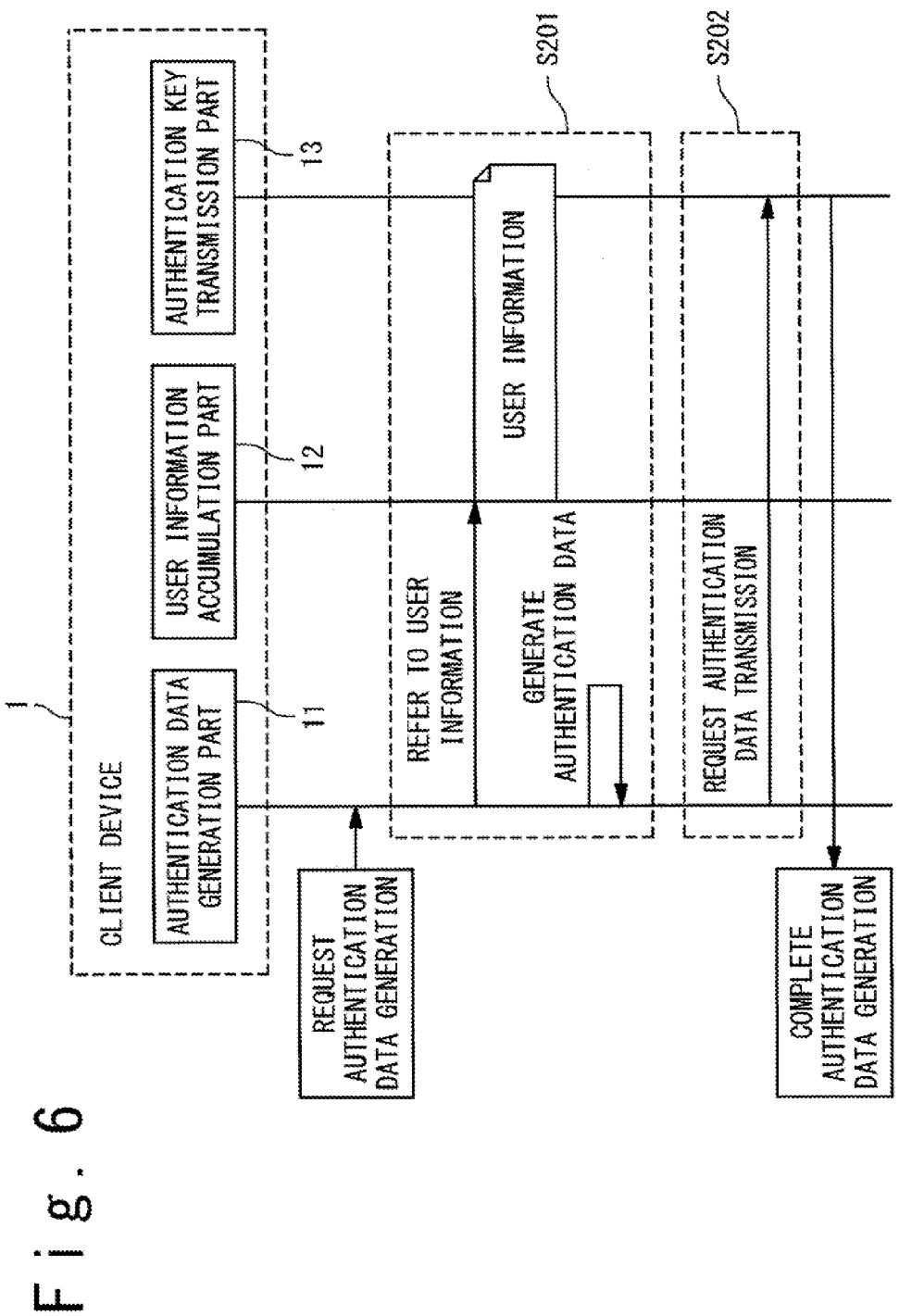

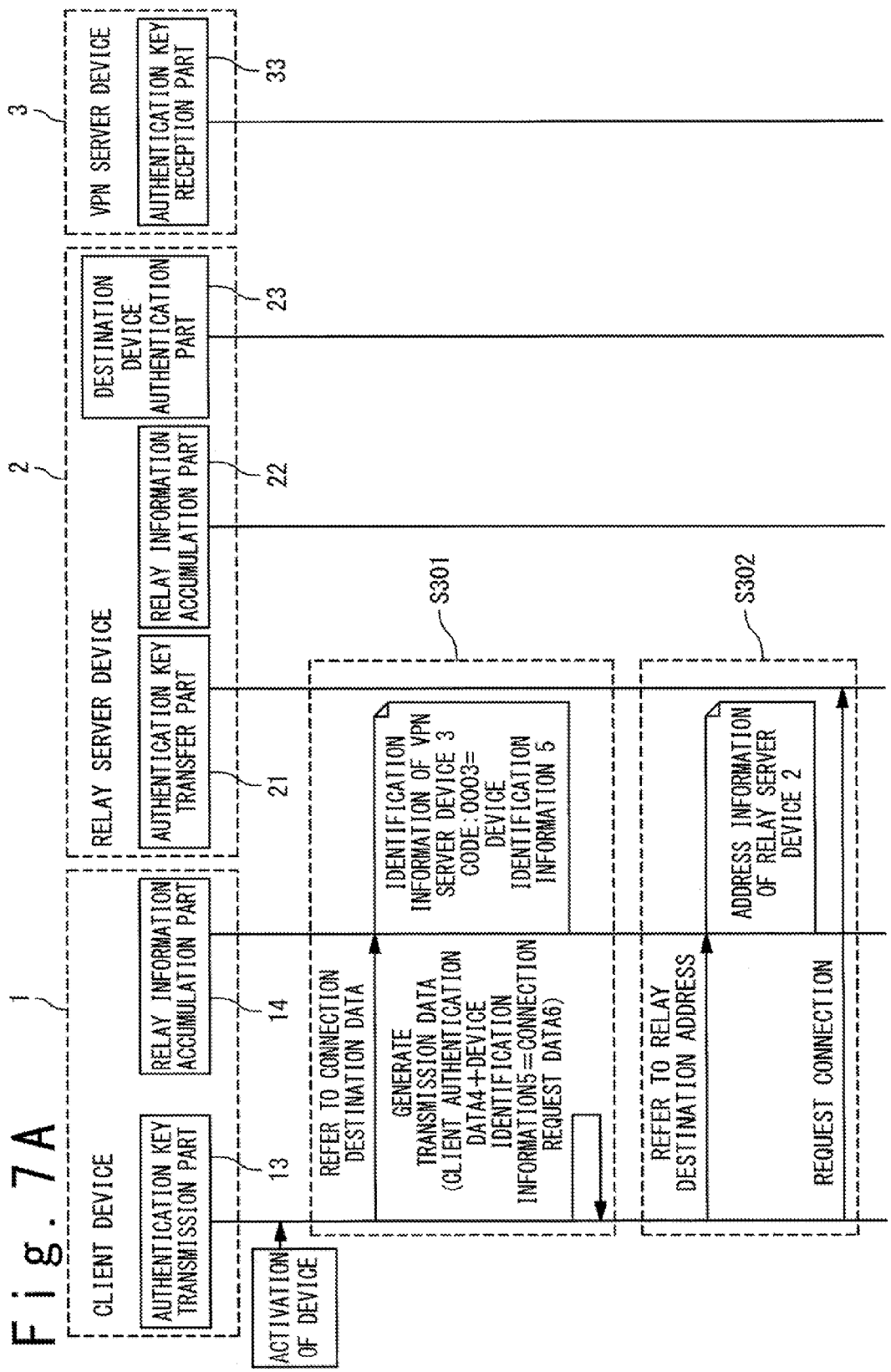

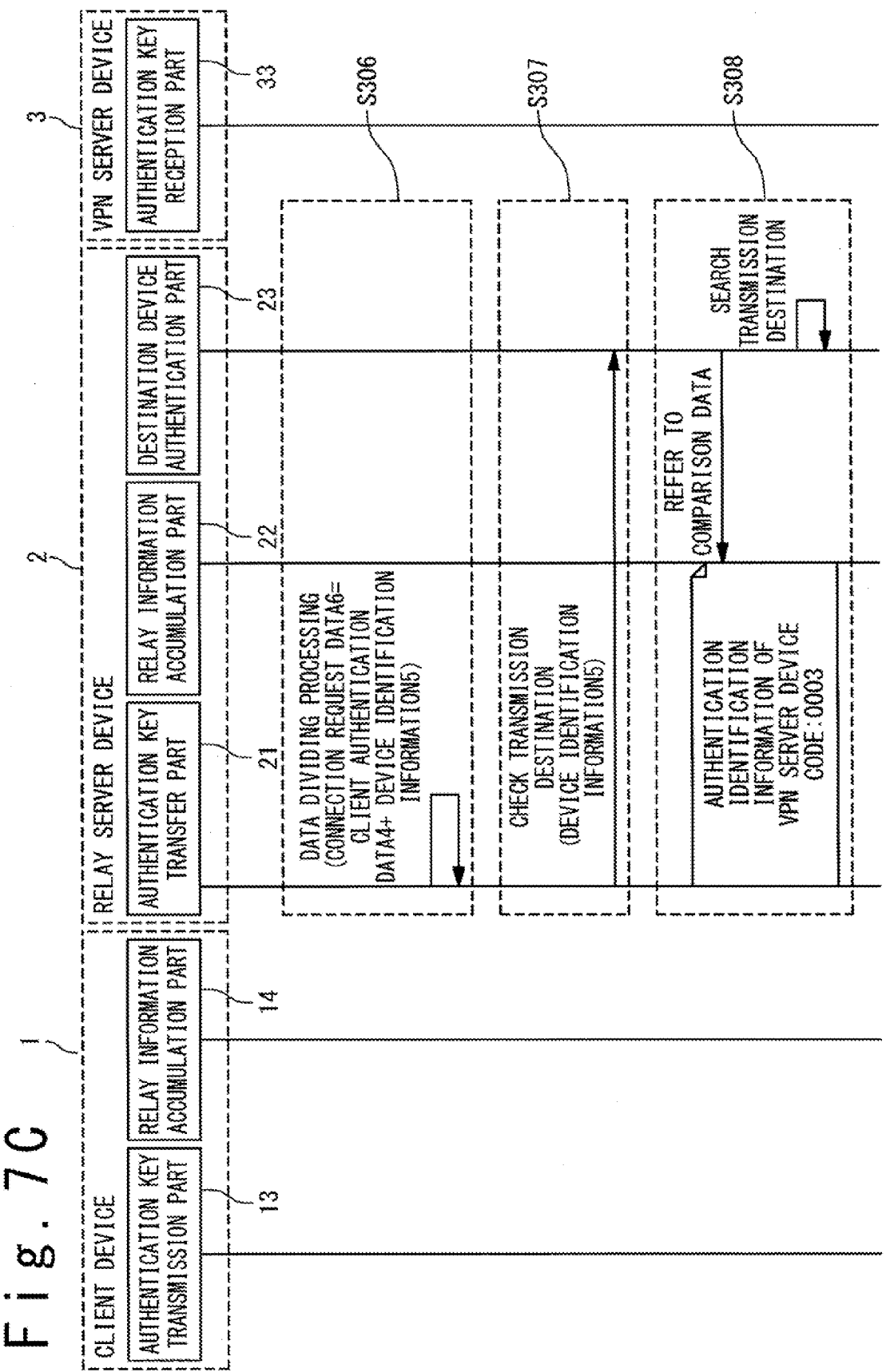

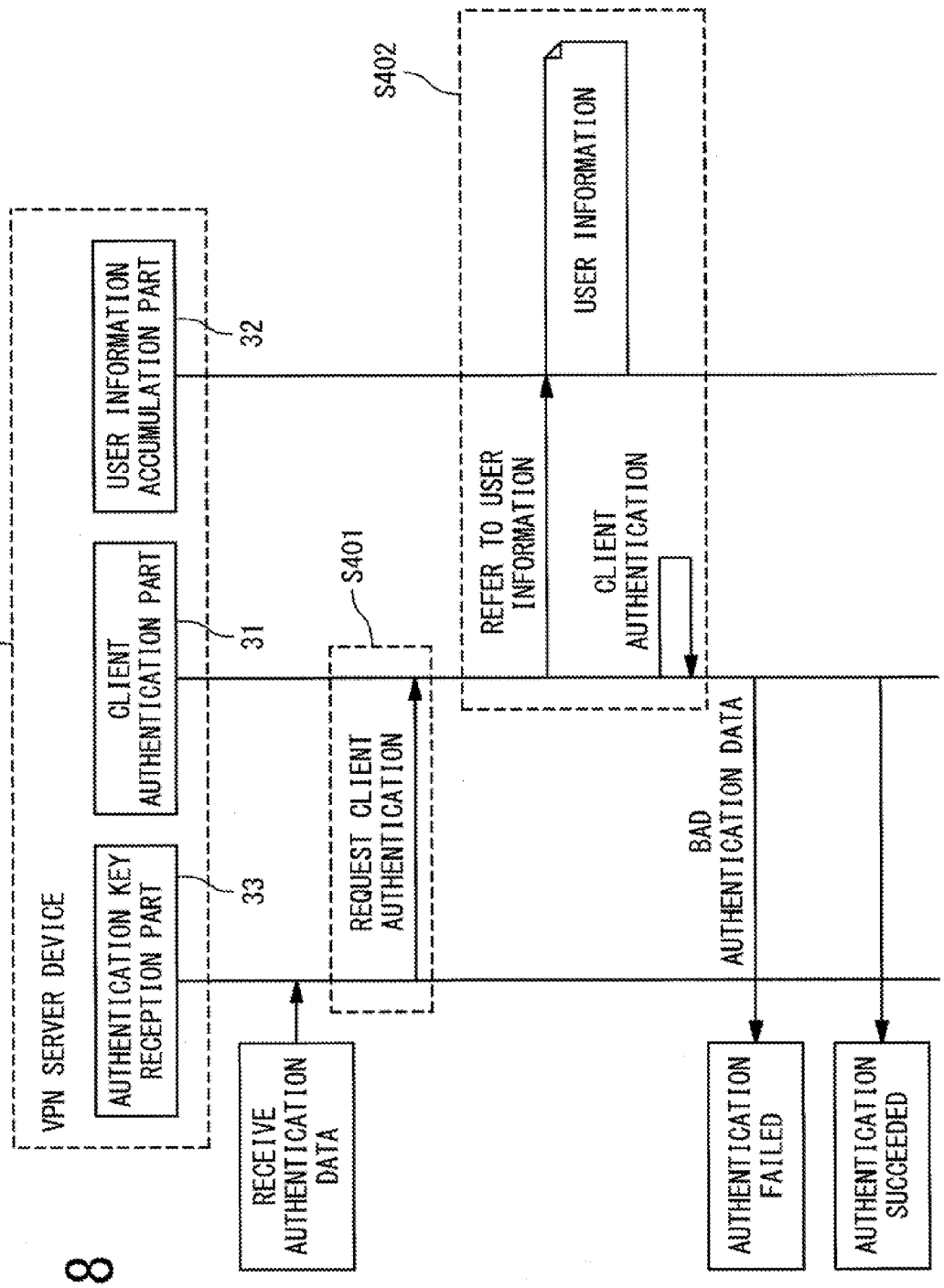

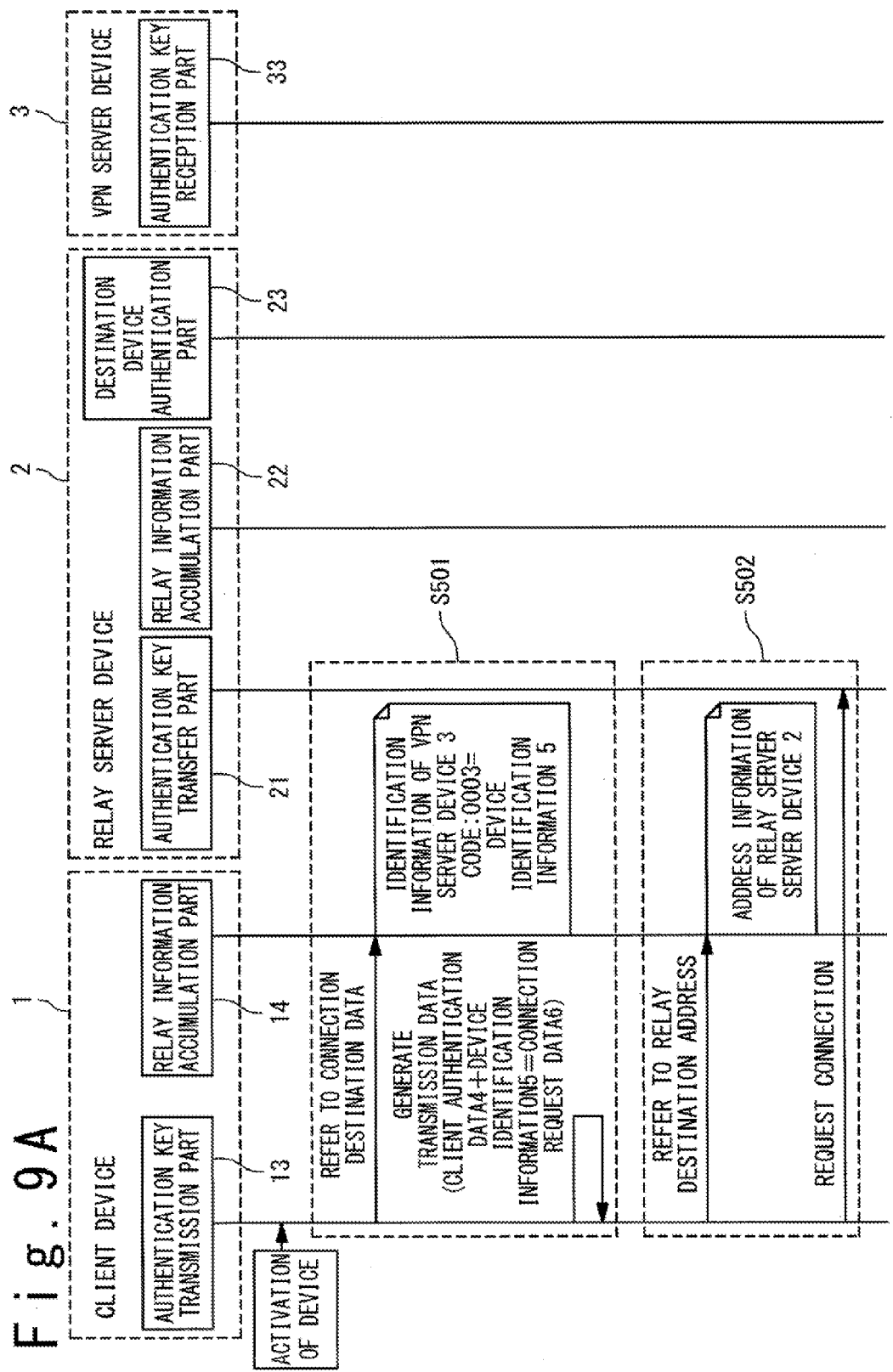

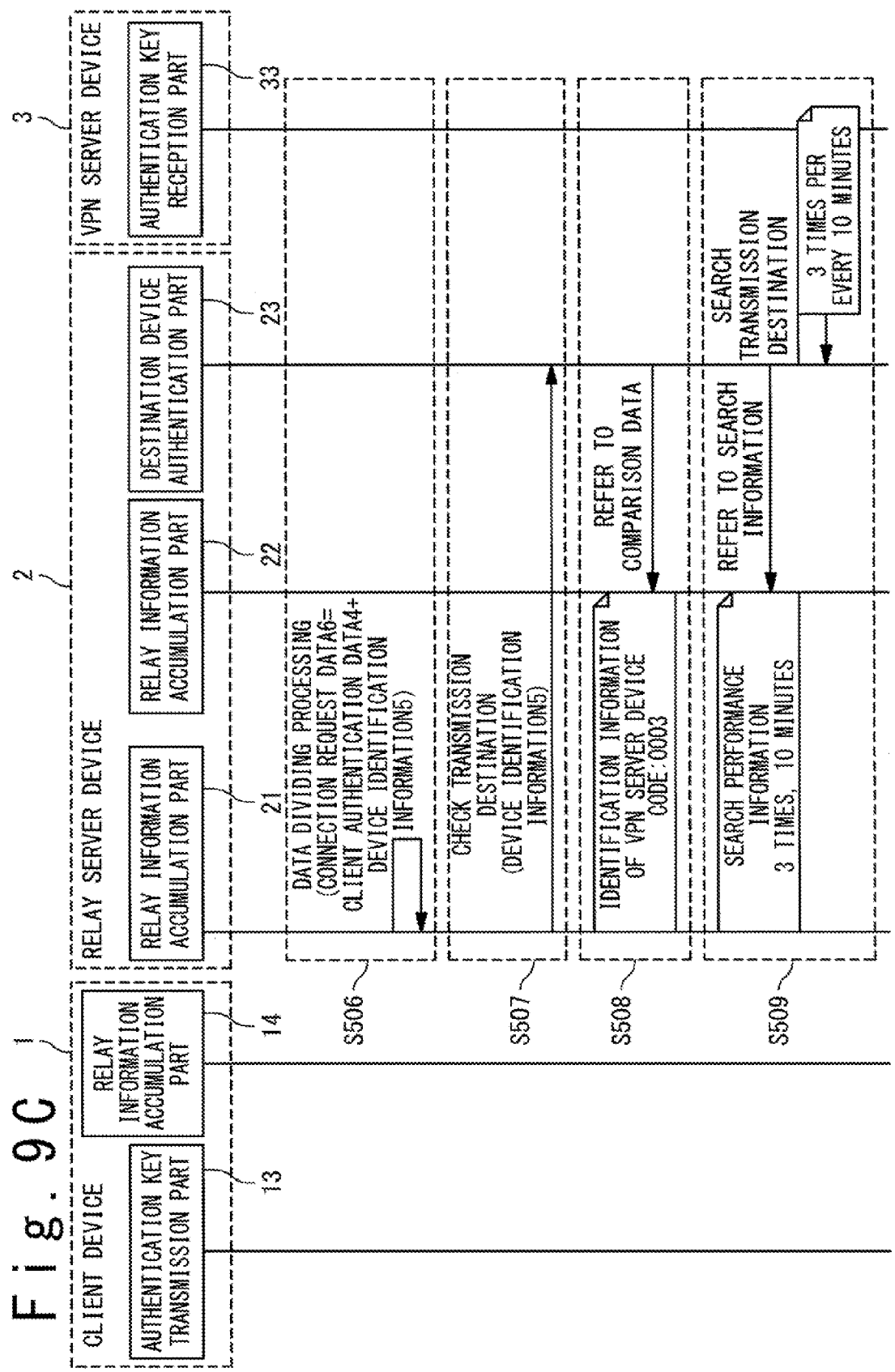

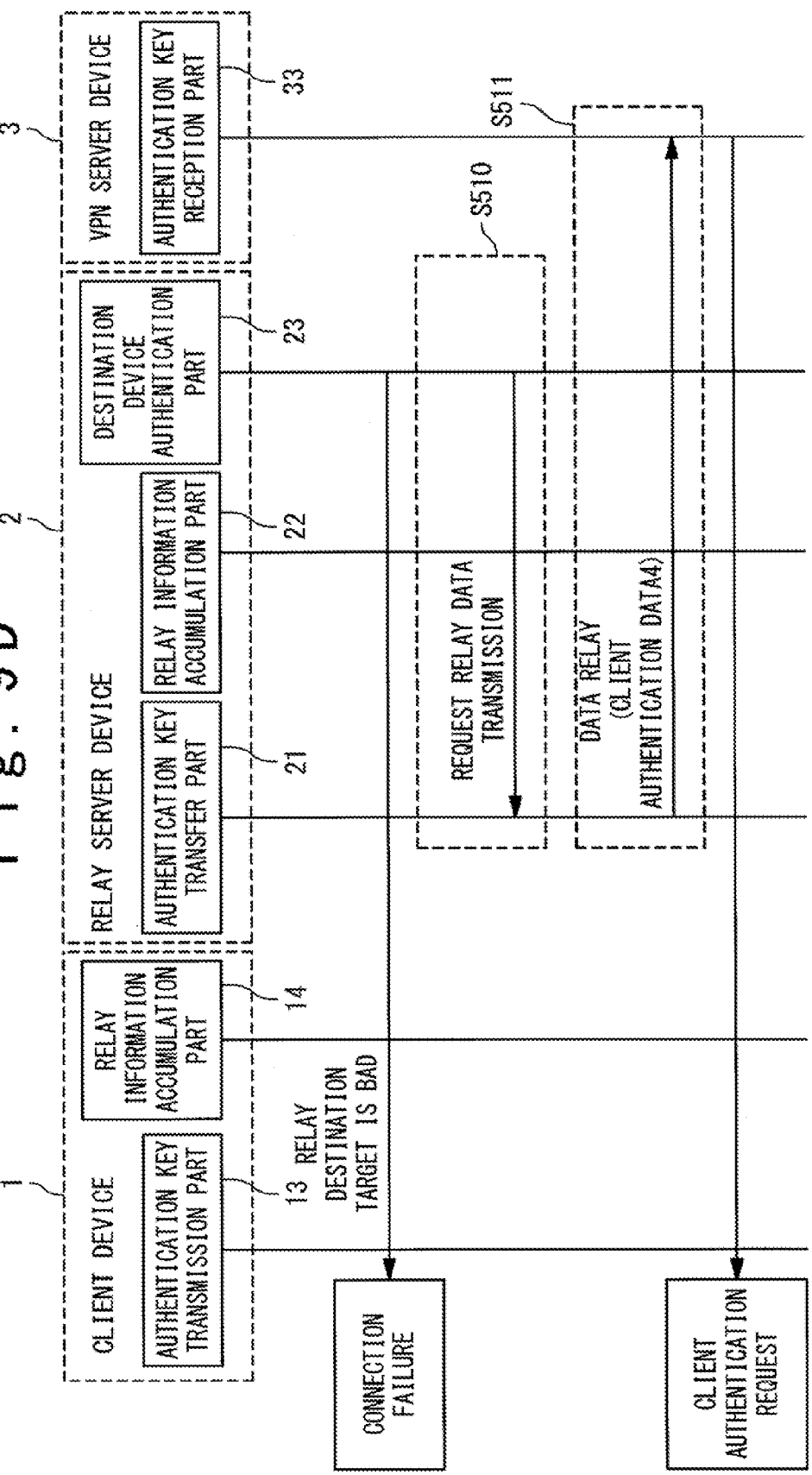

VPN CONNECTION SYSTEM AND VPN CONNECTION METHOD

INCORPORATION BY REFERENCE

This patent application is based on Japanese Patent Application No. 2009-048625 filed on Mar. 2, 2009. The disclosure of the Japanese Patent Application is incorporated herein by reference.

TECHNICAL FIELD

The present invention relates to a VPN (Virtual Private Network) connection system, and more particularly, to a VPN connection system that makes a callback system based VPN connection through a relay server.

BACKGROUND ART

Conventionally, there has been techniques related to a callback system based VPN (Virtual Private Network) connection using an electronic mail delivery system from a terminal carried outside a company office.

For example, Japanese Patent Publication JP2004-280595A (Patent document 1), and Domestic re-publication of PCT international publication for WO2006/011464 (Patent document 2) disclose related techniques.

An authentication method according to Japanese Patent Publication JP2004-280595A (Patent document 1) is a method that makes a callback system based VPN connection. In order to realize the method in Japanese Patent Publication JP2004-280595A, each of a client device and a server device that make the VPN connection based on the callback authentication method requires an SMTP (Simple Mail Transfer Protocol) client function and a POP (Post Office Protocol) client function. On the basis of such an electronic mail delivery system, delivery/receipt of authentication information used for the VPN connection is achieved.

However, this technique cannot make the VPN connection in a situation or environment where the SMTP or POP cannot be used. That is, in a case where the electronic mail delivery system is not present, or cannot be used, such a connection method cannot be carried out.

Also, in an environment where IT infrastructure is not sufficiently constructed, the electronic mail delivery system serves as a bottleneck. In such a case, it is known that there is a case that the communication times out.

For this reason, there is required an access method without use of the electronic mail delivery system. For example, it is required that, without use of the electronic mail delivery system, authentication information on a client side terminal is delivered to a VPN server device present on a company infrastructure network.

However, such means that delivers the authentication information from the client device to the VPN server device through a direct communication connection cannot be used. The reason is because in order to make the direct communication, it is additionally necessary to place the VPN server device in a DMZ (DeMilitarized Zone), and make settings for communication to a firewall. This is contradictory to the advantage in Japanese Patent Publication JP2004-280595A (Patent document 1).

SUMMARY OF THE INVENTION

An object of the present invention is to provide a connection method that makes a call back system based VPN connection without use of an electronic mail delivery system.

According to an aspect of the present invention, a VPN connection system includes: a client device; a relay server device; and a VPN server device. The client device generates a client authentication data in response to a VPN (Virtual Private Network) connection request. The relay server device relays a communication through a protocol which is different from an electronic mail. The VPN server device establishes an always-on connection with the relay server device through the protocol. The client device establishes a connection with the relay server through the protocol to transmit the client authentication data to the relay server. The relay server device relays the transmitted client authentication data to the VPN server device. The VPN server device performs an authentication of the client device based on the client authentication data, and to report a failure of a VPN connection to the client device when the authentication is failed, and implements a VPN connection with the client device when the authentication is succeeded.

According to another aspect of the present invention, a VPN connection method includes: a VPN (Virtual Private Network) server device establishing an always-on connection with the relay server device through the protocol; a client device generating a client authentication data in response to a VPN connection request; a client server establishing a connection with the relay server through the protocol to transmit the client authentication data to the relay server by the client server; the relay server relaying the transmitted client authentication data to the VPN server device; the VPN server device performing an authentication of the client device based on the client authentication data; the VPN server reporting a failure of a VPN connection to the client device when the authentication is failed; and the VPN server implementing a VPN connection with the client device when the authentication is succeeded.

Note that, in the VPN connection according to the present invention, the VPN server device is a computer set or a VM (Virtual Machine) environment functions as a VPN server. Also, the relay server device is a computer set or a VM environment function as a relay server. Also, the client device is computer set or a VM environment function as a client for the VPN server and the relay server.

According to the present invention, even in an environment where an SMTP or POP cannot be used, authentication can be performed in a VPN server on an infrastructure network.

BRIEF DESCRIPTION OF THE DRAWINGS

The above and other objects, advantages and features of the present invention will be more apparent from the following description of certain preferred exemplary embodiments taken in conjunction with the accompanying drawings, in which:

FIG. 3 is a diagram illustrating an example of a data table used in a relay server device;

FIG. 4 is a sequence diagram illustrating an outline of the entire operation in the VPN connection system of an exemplary embodiment of the present invention;

FIG. 5A is a sequence diagram illustrating an outline of first processing in the VPN connection system of an exemplary embodiment of the present invention;

FIG. 5B is the sequence diagram illustrating the outline of the first processing in the VPN connection system of an exemplary embodiment the present invention;

FIG. 5C is the sequence diagram illustrating the outline of the first processing in the VPN connection system of an exemplary embodiment of the present invention;

FIG. 6 is a sequence diagram illustrating an outline of second processing in the VPN connection system of an exemplary embodiment of the present invention;

FIG. 7A is a sequence diagram illustrating an outline of third processing in the VPN connection system of an exemplary embodiment of the present invention;

FIG. 7C is the sequence diagram illustrating the outline of the third processing in the VPN connection system of an exemplary embodiment of the present invention;

FIG. 8 is a sequence diagram illustrating an outline of fourth processing in the VPN connection system of an exemplary embodiment of the present invention;

FIG. 9A is a sequence diagram illustrating an outline of third processing of a VPN connection system in a second exemplary embodiment of the present invention;

FIG. 9C is the sequence diagram illustrating the outline of the third processing of the VPN connection system in the second exemplary embodiment of the present invention; and FIG. 9D is the sequence diagram illustrating the outline of the third processing of the VPN connection system in the second exemplary embodiment of the present invention.

EXEMPLARY EMBODIMENTS

First Exemplary Embodiment

A first exemplary embodiment of the present invention is described below referring to the accompanying drawings.

Figure 1:
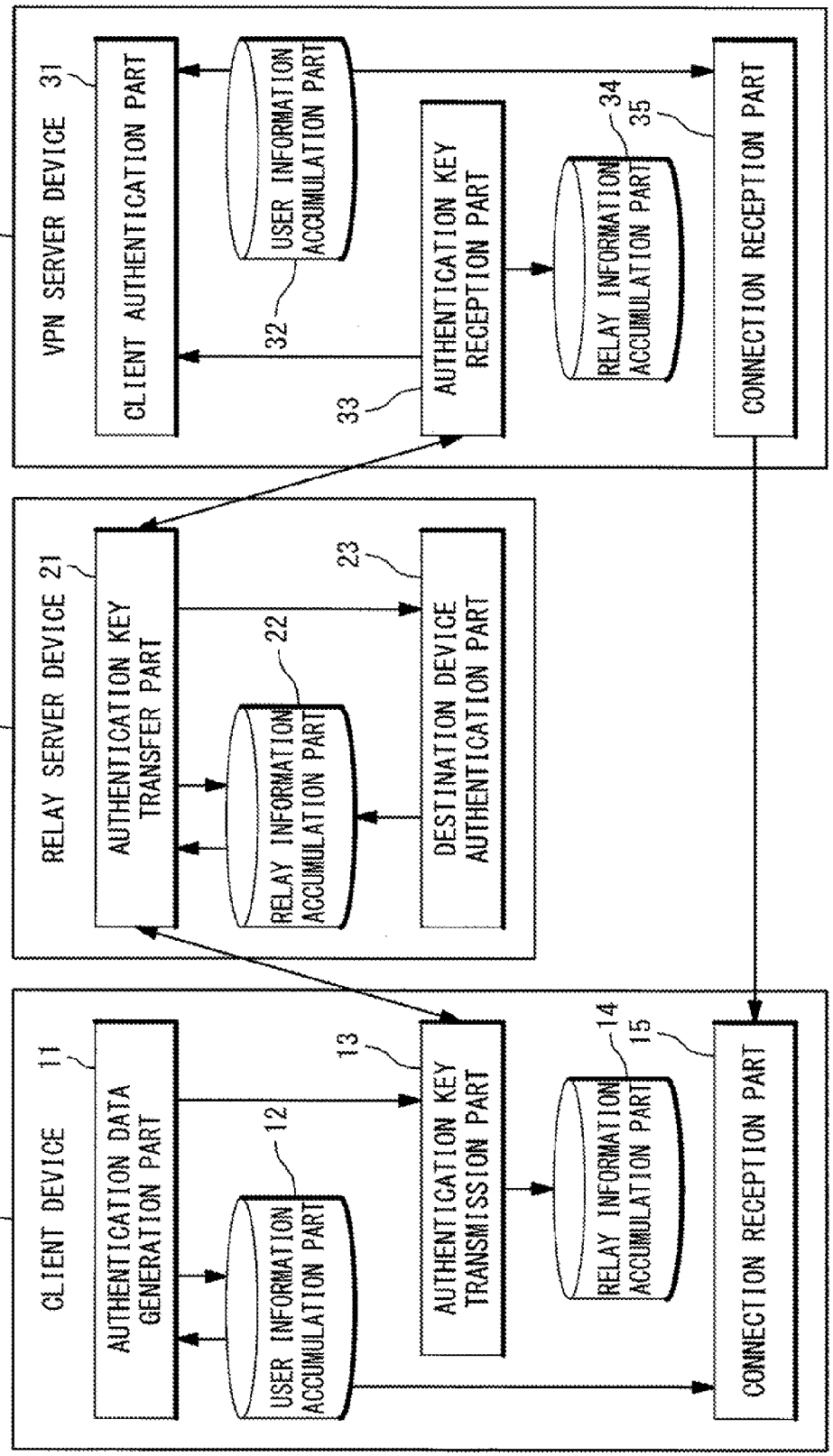
FIG. 1 is a block diagram illustrating a configuration example of a VPN connection system of an exemplary embodiment of the present invention.

As illustrated in FIG. 1, a VPN connection system according to the first exemplary embodiment of the present invention includes a client device 1, a relay server device 2, and a VPN server device 3.

The client device 1 serves as a client in a VPN connection.

The relay server device 2 is one that replaces an electronic mail delivery system. In the present exemplary embodiment, the relay server device 2 relays communication between a client and the server in the VPN connection through a connection method other than the VPN connection on the basis of a unique protocol different from that of the electronic mail delivery system (SMTP or POP).

The VPN server device 3 serves as a server in the VPN connection.

The client device 1 includes an authentication data generation part 11, a user information accumulation part 12, an authentication key transmission part 13, a relay information accumulation part 14, and a connection reception part 15.

The authentication data generation part 11 generates authentication data for performing terminal authentication in the server upon VPN connection request of the client. In the present exemplary embodiment, the authentication data generation part 11 generates, upon VPN connection request of the client device 1 to the VPN server device 3, the authentication data for authenticating the client device 1 in the VPN server device 3.

The user information accumulation part 12 (which is called also as the first user information accumulation part) is an information accumulation device that stores user information required to generate client authentication data used for the VPN connection request. In the present exemplary embodiment, the user information accumulation part 12 stores user information on the client device 1. As an example of the user information, identification information or attribute information of the user using the client device 1 is possible. However, in practice, the user information is not limited to such examples.

The authentication key transmission part 13 performs communication based on the VPN connection request. In the present exemplary embodiment, the authentication key transmission part 13 transmits the authentication data through a connection method other than the VPN connection on the basis of a unique protocol different from that of the electronic mail delivery system (SMTP or POP).

The relay information accumulation part 14 (which is called also as the first relay information accumulation part) is an information accumulation device that stores information required for communication through a relay server device. In the present exemplary embodiment, the relay information accumulation, part 14 stores identification information for identifying the relay server device 2. Note that the relay information accumulation part 14 may be adapted further to store information on a communication method between the client device 1 and the relay server 2, and between the relay server device 2 and the VPN server device 3.

The connection reception part 15 (which is called also as the first connection reception part) makes the VPN connection.

The relay server device 2 includes an authentication key transfer part 21, a relay information accumulation part 22, and a destination device authentication part 23.

The authentication key transfer part 21 transfers a data of connection request to a VPN server device to the VPN server device.

The relay information accumulation part 22 (which is called also as the second relay information accumulation part) is an information accumulation device that stores information required for communication. In the present exemplary embodiment, the relay information accumulation part 22 stores information indicating a status (ON/OFF) of the authentication data relay function. When the status of the authentication data relay function is turned on (ON), the authentication key transfer part 21 transfers the connection request data for a VPN server device to the VPN server device. Also, the relay information accumulation part 22 stores a data table that uniquely determines destination device identification information and destination connection information. That is, the relay information accumulation part 22 stores the data table in which the destination device identification information and the destination connection information are registered in relation to each other.

The destination device authentication part 23 determines whether or not communication to a VPN server device corresponding to a connection request destination can be performed.

The VPN server device 3 includes a client authentication part 31, a user information accumulation part 32, an authentication key reception part 33, a relay information accumulation part 34, and a connection reception part 35.

The client authentication part 31 authenticates a client device that has made the VPN connection request.

The user information accumulation part 32 (which is called also as the second user information accumulation part) is an information accumulation device that stores user information required to authenticate a client device upon the VPN connection request. For example, the user information accumulation part 32 stores user information that allows the VPN connection. Alternatively, the user information accumulation part 32 may be adapted to store user information that refuses the VPN connection.

The authentication key reception part 33 performs communication based on the VPN connection request.

The relay information accumulation part 34 (which is called also as the third relay information accumulation part) is an information accumulation device that stores information required for communication through a relay server device. In the present exemplary embodiment, the relay information accumulation part 34 stores address information on the relay server device 2.

The connection reception part 35 (which is called also as the second connection reception part) makes the VPN connection. In the present exemplary embodiment, the connection reception part 35 establishes the VPN connection with the connection reception part 15 to make the VPN connection.

Figure 2:
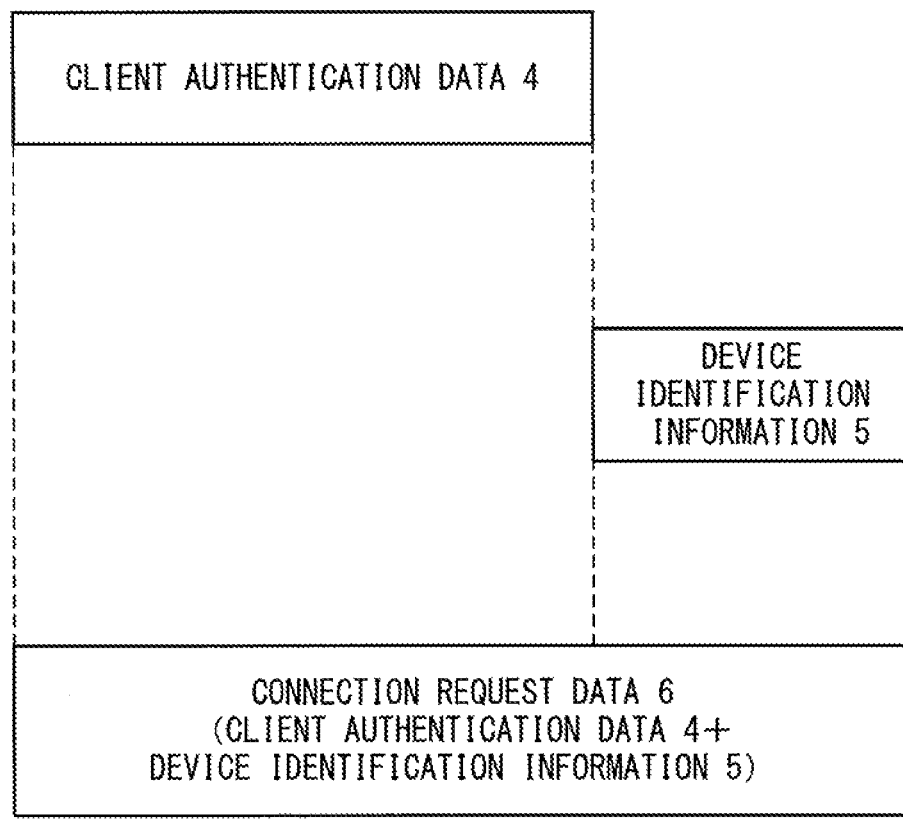
FIG. 2 is a diagram illustrating an example of authentication data used for a VPN connection request.

Referring to FIG. 2, the authentication data used for the VPN connection request is described.

The data used for the VPN connection include client authentication data 4, device identification information 5, and connection request data 6.

The client authentication data 4 is authentication data generated by the client device. The client authentication data 4 is used for client authentication performed in the VPN server device that has received the VPN connection request. In the present exemplary embodiment, the client authentication data 4 is generated by the client device 1. Upon receipt of the VPN connection request from the client device 1 through the relay server device 2, the VPN server device 3 uses the client authentication data 4 included in the VPN connection request to perform the client authentication.

The device identification information 5 is identification information unique to the VPN server device. In the present exemplary embodiment, the device identification information 5 indicates the VPN server device 3.

The connection request data 6 is transmission data for relay, which is intended for a relay server device. In the present exemplary embodiment, the connection request data 6 is transmitted to the relay server device 2. The connection request data 6 includes the client authentication data 4 and device identification information 5.

FIG. 3 illustrates the data table used in the relay server device 2. The data table is stored in the relay information accumulation part 22. The data table has an entry number, destination device identification information, and destination connection information. In the present exemplary embodiment, for an entry number "1", destination device identification information "0003" and destination connection information "Connection 1" are stored. Also, for an entry number "2", destination device identification information "0033" and destination connection information "Connection 2" are stored.

Next, the operation according to the first exemplary embodiment of the present invention is described below in detail.

The present exemplary embodiment is based on the assumption that the following information is already registered in the respective information accumulation parts.

In each of the user information accumulation device 12 and the user information accumulation part 32, information on the same user for whom the connection authentication is performed (user information A) is registered.

In the relay information accumulation part 14, the device identification information 5 (code: 0003) on the VPN server device 3 is registered. Also, in the relay information accumulation part 14, the address information on the relay server device 2 is registered.

In the relay information accumulation part 22, the information indicating the status (ON/OFF) of the authentication data relay function is stored. Also, in the relay information accumulation part 22, connection authentication information (code: 0002) on the relay server device 2 is registered.

In the relay information accumulation part 34, the connection authentication information (code: 0002) on the relay server device 2, and the device identification information 5 (code: 0003) on the VPN server device 3 are registered. Also, in the relay information accumulation part 34, the address information on the relay server device 2 is registered.

In the following, referring to FIG. 4, the outline of the entire operation in the VPN connection system according to the first exemplary embodiment of the present invention is described.

(1) Step S1

The VPN server device 3 establishes an always-on connection with the relay server device 2 upon activation of the device. The always-on connection is a connection that is other than the VPN connection and based on a unique protocol different from that of the electronic mail delivery system (SMTP or POP).

(2) Step S2

Upon VPN connection request of the client, the client device 1 starts the VPN connection, and generates the client authentication data 4.

(3) Step S3

The client device 1 establishes a connection with the relay server device 2 to transmit the client authentication data 4. The connection is one that is other than the VPN connection and based on a unique protocol different from that of the electronic mail delivery system (SMTP or POP). The relay server device 2 relays the data to transfer the client authentication data 4 to the VPN server device 3.

(4) Step S4

The VPN server device 3 performs client authentication on the basis of the client authentication data 4. If the authentication fails as a result of the client authentication, the VPN server device 3 notifies the client device 1 of the failure in the VPN connection.

In addition, if the authentication succeeds as a result of the client authentication, the VPN server device 3 makes the VPN connection with the client device 1.

Referring to sequence diagrams illustrated in FIGS. 5A, 5B, and 5C, operation corresponding to a part surrounded by a dashed line indicating Step S1 in FIG. 4 is described.

(1) Step S101

The authentication key reception part 33 refers to the relay information accumulation part 34 to check the address information on the relay server device 2, and on the basis of the address information, makes a connection request to the authentication key transfer part 21.

(2) Step S102

The authentication key transfer part 21 refers to the relay information accumulation part 22 to check the status of the authentication data relay function. If the status of the authentication data relay function is turned off (OFF), the authentication key transfer part 21 does not use the function, and therefore does not perform any subsequent operation. That is, if the status of the authentication data relay function is OFF, the relay server device 2 terminates processing here.

(3) Step S103

If the status of the authentication data relay function is ON, the authentication key transfer part 21 makes a request to the authentication key reception part 33 for the connection authentication information.

(4) Step S104

The authentication key reception part 33 refers to the relay information accumulation part 34 to acquire the connection authentication information (code: 0002) used for communication with the relay server device 2, and transmits the connection authentication information (code: 0002) to the authentication key transfer part 21.

(5) Step S105

The authentication key transfer part 21 receives the connection authentication information (code: 0002) from the authentication key reception part 33, and refers to the relay information accumulation part 22 to compare the connection authentication information (code: 0002) received from the authentication key reception part 33 with the referable registered connection authentication information. As a result of the comparison, if the pieces of connection authentication information do not match each other, the authentication key transfer part 21 regards the request as a bad connection request, and does not perform any subsequent operation.

(6) Step S106

As a result of the comparison, if the pieces of connection authentication information match each other, the authentication key transfer part 21 allows an always-on connection with the authentication key reception part 33 to be established.

(7) Step S107

If the always-on connection with the authentication key transfer part 21 is established, the authentication key reception part 33 refers to the relay information accumulation part 34 to acquire the device identification information 5 (code: 0003) on the VPN server device 3, and transmits the device identification information 5 (code: 0003) to the authentication key transfer part 21.

(8) Step S108

The authentication key transfer part 21 receives the device identification information 5 (code: 0003) from the authentication key reception part 33 to register it in the relay information accumulation part 22 as the data table that uniquely determines "the device identification information 5" and "the connection information (Connection 1) between the authentication transfer part 21 and the authentication key reception part 33". The data table is illustrated in FIG. 3.

Referring to a sequence diagram illustrated in FIG. 6, operation corresponding to a part surrounded by a dashed line indicating Step S2 in FIG. 4 is described.

(1) Step S201

In response to an authentication data generation request, the authentication data generation part 11 refers to the user information accumulation device 12 to acquire the information on the user (user information A), and generates the client authentication data 4 used for the client authentication.

(2) Step S202

The authentication data generation part 11 transmits the generated client authentication data 4 to the authentication key transmission part 13 to make a request to transmit the client authentication data 4.

Figure 7B:
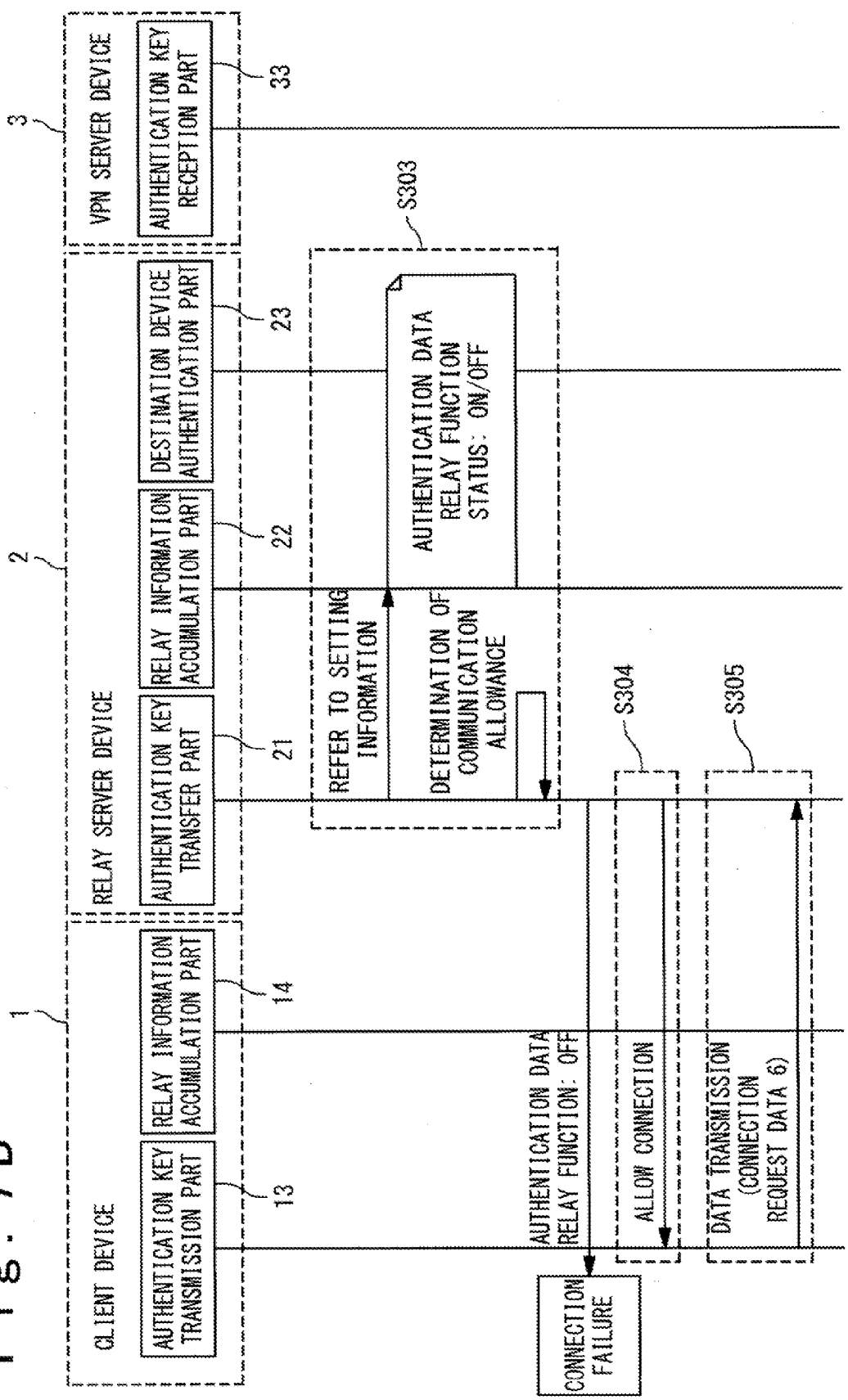
FIG. 7B is the sequence diagram illustrating the outline of the third processing in the VPN connection system of an exemplary embodiment of the present invention.
Figure 7D:
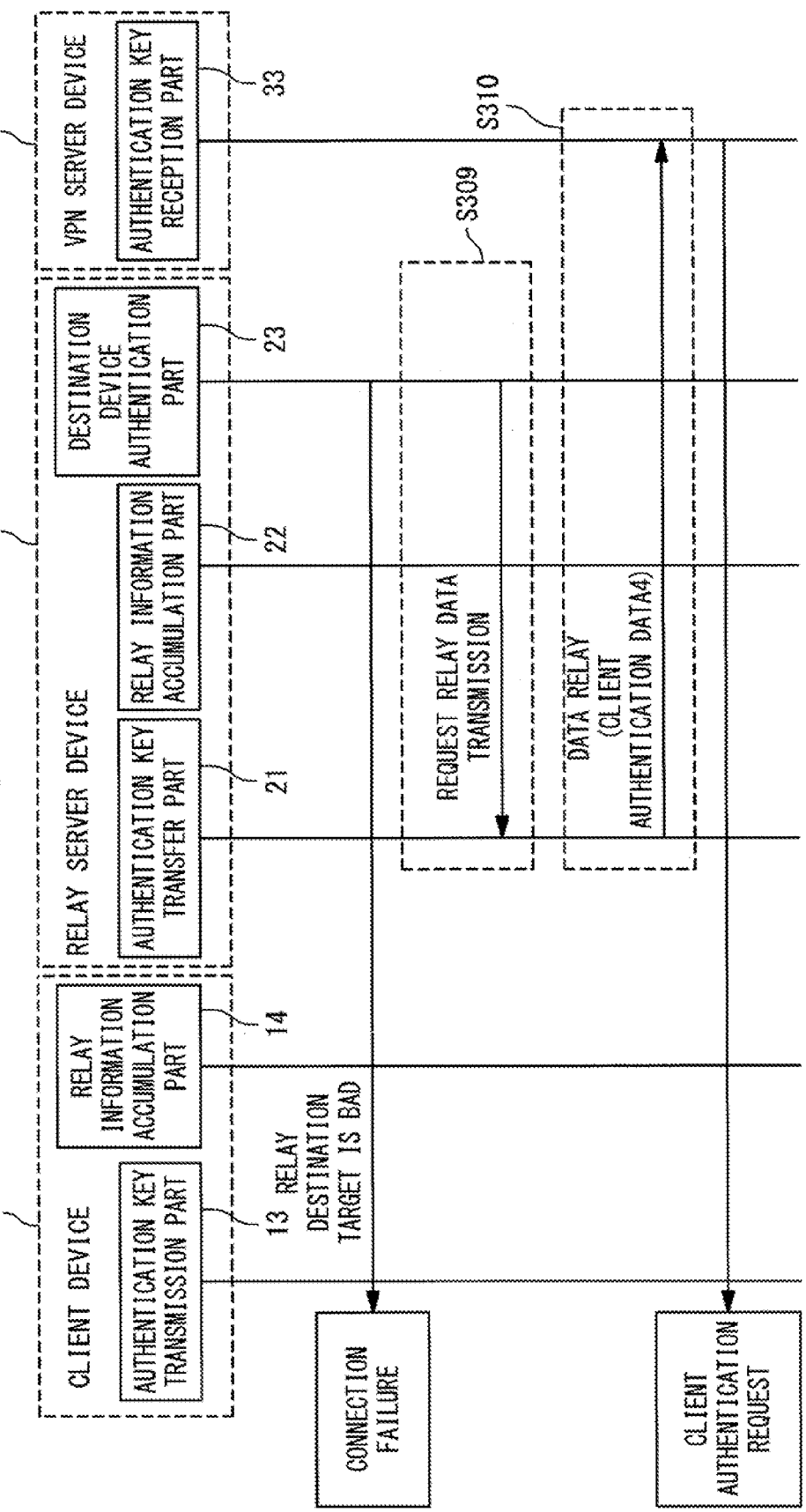
FIG. 7D is the sequence diagram illustrating the outline of the third processing in the VPN connection system of an exemplary embodiment of the present invention.
Figure 9B:
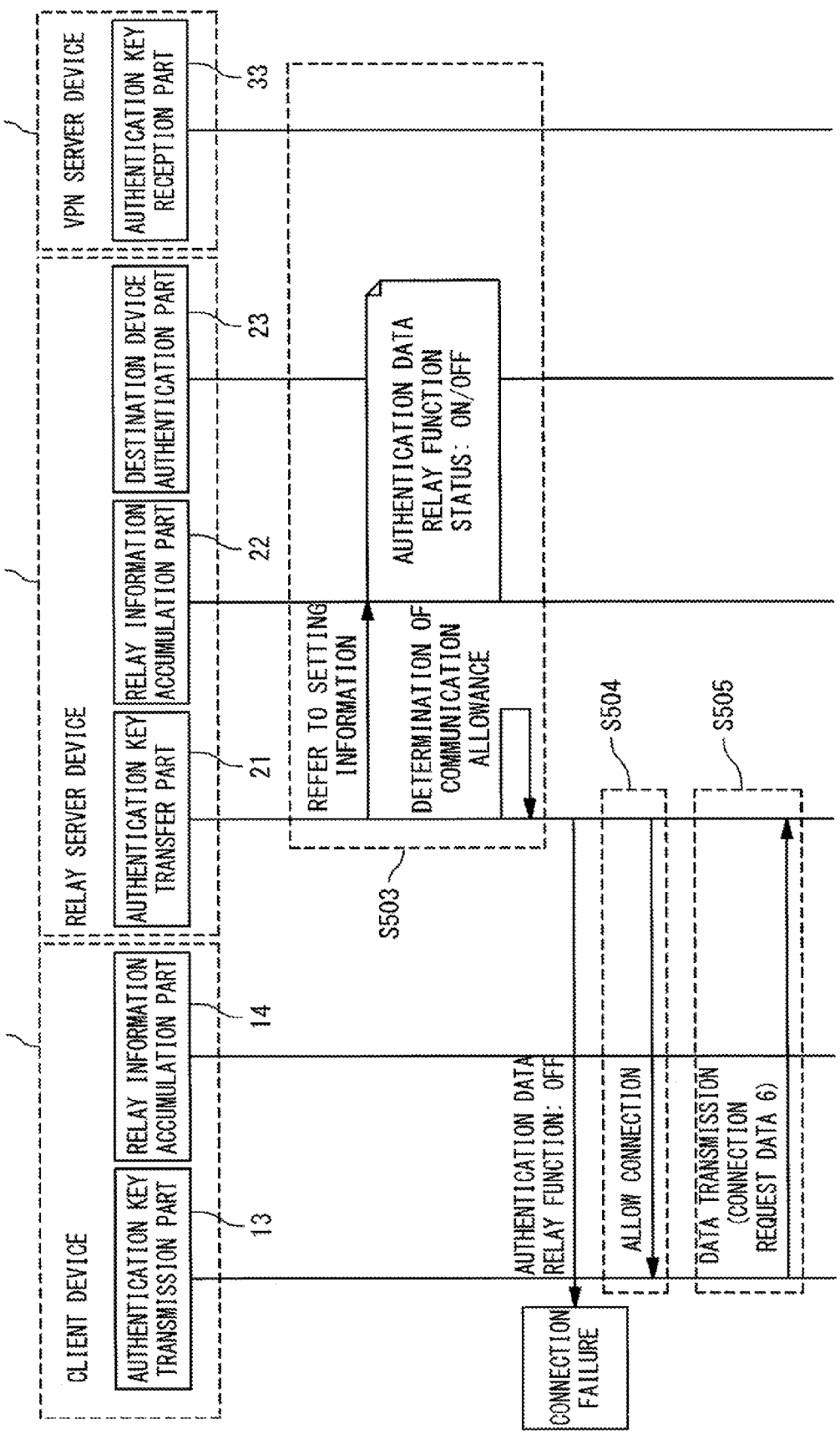
FIG. 9B is the sequence diagram illustrating the outline of the third processing of the VPN connection system in the second exemplary embodiment of the present invention.

Referring to a sequence diagram illustrated in FIGS. 7A, 7B, and 7C, operation corresponding to a part surrounded by a dashed line indicating Step S3 in FIG. 4 is described.

(1) Step S301

The authentication key transmission part 13 refers to the relay information accumulation part 14 to acquire the device identification information 5 (code: 0003) on the VPN server device 3 that is a destination VPN server device 3, and adds the device identification information 5 (code: 0003) to the client authentication data 4 to generate the connection request data 6 to be transmitted to the relay server device 2.

(2) Step S302

The authentication key transmission part 13 refers to the relay information accumulation part 14 to check the address information on the relay server device 2, and on the basis of the address information, makes a connection request to the authentication key transfer part 21.

(3) Step S303

The authentication key transfer part 21 refers to the relay information accumulation part 22 to check the status of the authentication data relay function. If the status is OFF, the authentication key transfer part 21 does not use the function, and therefore does not perform any subsequent operation. That is, if the status of the authentication data relay function is OFF, the relay server device 2 terminates the processing here.

(4) Step S304

If the status of the authentication data relay function is ON, the authentication key transfer part 21 notifies the authentication key transmission part 13 of communication connection allowance to allow data transmission. That is, the authentication key transfer part 21 allows a connection with the authentication key transmission part 13 to be established.

(5) Step S305

The authentication key transmission part 13 receives the communication connection allowance from the authentication key transfer part 21, and if the data transmission is allowed, transmits the connection request data 6 to the authentication key transfer part 21.

(6) Step S306

The authentication key transfer part 21 receives the connection request data 6, and divides the connection request data 6 into the client authentication data 4 and the device identification information 5 (code: 0003).

(7) Step S307

The authentication key transfer part 21 notifies the destination device authentication part 23 of the device identification information 5 (code: 0003) to make a request to check a destination VPN server device corresponding to the device identification information 5 (code: 0003).

(8) Step S308

The destination device authentication part 23 refers to the relay information accumulation part 22 to check device identification information matching the device identification information 5 (code: 0003) on the data table as illustrated in FIG. 3. If the device identification information matching the device identification information 5 (code: 0003) is not present in the data table, the destination device authentication part 23 regards the request as a bad connection request, and does not perform any subsequent operation.

(9) Step S309

If the device identification information matching the device identification information 5 (code: 0003) is present in the data table, the destination device authentication part 23 acquires connection information corresponding to the device identification information from the data table, and makes a request to the authentication key transfer part 21 for data transmission using an always-on connection based on the connection information.

(10) Step S310

The authentication key transfer part 21 uses the always-on connection requested from the destination device authentication part 23 to transmit the client authentication data 4 to the authentication key reception part 33.

In the following, operation corresponding to a part surrounded by a dashed line indicating Step S4 in FIG. 4 is illustrated in a sequence diagram (FIG. 8) to provide a description.

(1) Step S401

The authentication key reception part 33 receives the client authentication data 4 from the authentication key transfer part 21 to make a request to the client authentication part 31 for client authentication using the client authentication data 4.

(2) Step S402

The client authentication part 31 refers to the user information accumulation part 32 to acquire the information on the user (user information A), and performs authentication of the client authentication data 4. If the authentication fails, the client authentication part 31 regards the request as a bad connection request, and does not perform any subsequent operation.

In addition, if the authentication succeeds, the client authentication part 31 regards the request as a proper request to allow the VPN connection with the client device 1. In the present exemplary embodiment, the client authentication part 31 registers information that the VPN connection with the client device 1 is allowed in the user information accumulation part 32.

The connection reception part 35 refers to the user information accumulation part 32, and if the information that the VPN connection with the client device 1 is allowed is registered, makes a VPN connection with the connection reception part 15. That is, the VPN server device 3 makes the VPN connection with the client device 1.

From the above, the callback system based VPN connection can be made without use of the electronic mail delivery system.

According to this exemplary embodiment of the present invention, the callback system based VPN connection can be authenticated regardless of the presence or absence of the electronic mail delivery system.

Also, according to this exemplary embodiment of the present invention, the callback system based VPN connection can be introduced to a company that operates a business only with a Web mail and groupware.

According to this exemplary embodiment of the present invention, the electronic mail delivery system is not used, so that the speed for the authentication of a connection request can be enhanced.

Second Exemplary Embodiment

A second exemplary embodiment of the present invention is described below.

In the case where a connection request from a client device is received before completion of establishment of an always-on connection with the VPN server device 3, the present exemplary embodiment suspends connection authentication to enhance connectivity.

A configuration of a VPN connection system in the present exemplary embodiment is the same as that in the first exemplary embodiment. That is, the VPN connection system in the present exemplary embodiment includes, as illustrated in FIG. 1, the client device 1, the relay server device 2, and the VPN server device 3.

The client device 1, the relay server device 2, and the VPN server device 3 are the same as those in the first exemplary embodiment.

The present exemplary embodiment is based on the assumption that the following operations are already performed.

The relay server device 2 registers information indicating a status (ON/OFF) of an authentication data relay function in a relay information accumulation part 22. Also, the relay server device 2 registers connection authentication information (code: 0002) on the relay server device 2 in the relay information accumulation part 22.

Further, the relay server device 2 registers search performance information on a destination server (for example, three times at intervals of 10 seconds) in the relay information accumulation part 22. Note that the search performance information is information defining the interval and the number of times on the basis of which an authentication key transfer part 21 performs check processing of device identification information matching a device identification information 5 (code: 0003) notified from the VPN server device 3 on a data table in the relay information accumulation part 22.

The VPN server device 3 registers the connection authentication information (code: 0002) on the relay server device 2 and the device identification information 5 (code: 0003) on the VPN server device 3 in a relay information accumulation part 34.

The VPN server device 3 registers address information on the relay server device 2 in the relay information accumulation part 34.

The client device 1 registers the device identification information 5 (code: 0003) on the VPN server device 3 in the relay information accumulation part 14.

The client device 1 registers the address information on the relay server device 2 in the relay information accumulation part 14.

The client device 1 registers information on the same user who performs connection authentication (user information A) in a user information accumulation device 12. Similarly, the VPN server device 3 registers the information on a same user who performs the connection authentication (user information A) in the user information accumulation part 32.

In the present exemplary embodiment, an operation corresponding to a part surrounded by the dashed line indicating Step S3 in FIG. 4 is different from that in the first exemplary embodiment. The other operations are the same as those in the first exemplary embodiment.

Referring to the sequence diagram illustrated in FIGS. 9A, 9B, 9C, and 9D, the operation corresponding to the part surrounded by the dashed line indicating Step S3 in FIG. 4 in the present exemplary embodiment is described.

(1) Step S501

An authentication key transmission part 13 refers the relay information accumulation part 14 to acquire the device identification information 5 (code: 0003) on the VPN server device 3 that is the destination VPN server device 3, and adds the device identification information 5 (code: 0003) to the client authentication data 4 to generate connection request data 6 to be transmitted to the relay server device 2.

(2) Step S502

The authentication key transmission part 13 refers to the relay information accumulation part 14 to check the address information on the relay server device 2, and on the basis of the address information, makes a connection request to the authentication key transfer part 21.

(3) Step S503

The authentication key transfer part 21 refers to the relay information accumulation part 22 to check a status of the authentication data relay function. If the status of the authentication data relay function is OFF, the authentication key transfer part 21 does not use the function, and therefore does not perform any subsequent operation. That is, if the status of the authentication data relay function is OFF, the relay server device 2 terminates processing here.

(4) Step S504

If the status of the authentication data relay function is ON, the authentication key transfer part 21 notifies the authentication key transmission part 13 of communication connection allowance to allow data transmission. That is, the authentication key transfer part 21 allows a connection with the authentication key transmission part 13 to be established.

(5) Step S505

The authentication key transmission part 13 receives the communication connection allowance from the authentication key transfer part 21, and if the data transmission is allowed, transmits the connection request data 6 to the authentication key transfer part 21.

(6) Step S506

The authentication key transfer part 21 receives the connection request data 6, and divides the connection request data 6 into the client authentication data 4 and the device identification information 5 (code: 0003).

(7) Step S507

The authentication key transfer part 21 notifies a destination device authentication part 23 of the device identification information 5 (code: 0003) to make a request to check a destination VPN server device corresponding to the device identification information 5 (code: 0003).

(8) Step S508

The destination device authentication part 23 refers to the relay information accumulation part 22 to check device identification information matching the device identification information 5 (code: 0003) on the data table as illustrated in FIG. 3. If the device identification information matching the device identification information 5 (code: 0003) is not present in the data table, the destination device authentication part 23 makes the check again after a certain period of time.

(9) Step S509

The destination device authentication part 23 refers to the relay information accumulation part 22 to check the search performance information (three times at intervals of 10 seconds), and performs check processing of the device identification information matching the device identification information 5 (code: 0003) a predetermined number of times at predetermined intervals. In the present exemplary embodiment, the destination device authentication part 23 performs the check processing of the device identification information matching the device identification information 5 (code: 0003) three times at intervals of 10 seconds. If all of the three checks result in mismatching, the destination device authentication part 23 regards the request as a bad connection request, and does not perform any subsequent operation.

(10) Step S510

If the device identification information matching the device identification information 5 (code: 0003) is present, the destination device authentication part 23 acquires connection information corresponding to the device identification information from the data table, and makes a requests to the authentication key transfer part 21 for data transmission using an always-on connection based on the connection information.

(11) Step S511

The authentication key transfer part 21 uses the always-on connection requested from the destination device authentication part 23 to transmit the client authentication data 4 to an authentication key reception part 33.

Note that the above respective exemplary embodiments can be performed in combination. For example, the VPN connection system of the present invention may be adapted to be able to select a function corresponding to each of the above-described exemplary embodiments.

As described above, in the VPN connection system of the present invention, the callback system based VPN connection is made without use of the electronic mail delivery system.

The VPN connection system according to the above-mentioned exemplary embodiments of the present invention uses a device that relays VPN connection authentication data to a VPN connection server on the basis of a unique protocol. In the VPN connection system of such exemplary embodiments, there is prepared a device having a relay function (relay device) in order to transfer authentication information on a client device to a VPN server device. The relay device does not use the SMTP or the POP, but makes communication on the basis of the unique protocol different from that of the electronic mail delivery system (SMTP or POP).

The relay device used in the VPN connection system of the present invention can perform relay transmission between a plurality of client devices and a plurality of VPN server devices. Also, in the case of using the relay device, communications between the respective devices are assumed to be all encoded.

Also, in the communication based on the unique protocol, existing port numbers used in the relay device are used.

For this reason, even in an environment where the SMTP or POP cannot be used, authentication using a VPN server device present on a company intranet can be performed. This enables the VPN connection based on the conventional callback authentication system to be made independently of the presence or absence of the electronic mail delivery system.

As above, some exemplary embodiments of the present invention have been described in detail; however, in practice, the present invention is not limited to any of the above-described exemplary embodiments, but includes any modification without departing from the scope of the present invention.

Further Exemplary Embodiment 1

A VPN connection system, wherein the authentication key transfer part establishes a connection with the client device through the protocol when the status of the authentication data relay function is turned on, receives the connection request data, and divides the connection request data into the client authentication data and the device identification information.

Further Exemplary Embodiment 2

A VPN Connection Method, comprising: the relay server device establishes a connection with the client device through the protocol when the status of the authentication data relay function is turned on, receives the connection request data, and divides the connection request data into the client authentication data and the device identification information.

What is claimed is:

1. A VPN connection system comprising:
a client device configured to generate a client authentication data in response to a VPN (Virtual Private Network) connection request;
a relay server device configured to relay a communication through a protocol which is different from an electronic mail; and
a VPN server device configured to establish an always-on connection with the relay server device through the protocol,
wherein the client device is configured to establish a connection with the relay server through the protocol to transmit the client authentication data to the relay server,
the relay server device is configured to use the always-on connection to relay the transmitted client authentication data to the VPN server device when a connection is established with the client device, and
the VPN server device is configured to perform an authentication of the client device based on the client authentication data, and to report a failure of a VPN connection to the client device when the authentication is failed, and to implement a VPN connection with the client device when the authentication is succeeded,
wherein the relay server device comprises:
a first relay information accumulation processor configured to store status information indicating whether an authentication data relay function is turned on or turned off and connection authentication information specifying the relay server device;
an authentication key transfer processor configured to request a VPN server device side connection authentication information to the VPN server device when the authentication data relay function is turned on and the device identification information is transmitted from the client device, and to establish an always-on connection with the relay server device and the VPN server device through the protocol when the connection authentication information stored in the first relay information accumulation processor and the VPN server device side connection authentication information is matched.

2. The VPN connection system according to claim 1, wherein the client device comprises:
a first user information accumulation processor configured to store user information being used for generating the client authentication data;
an authentication data generation processor configured to generate the client authentication data in response to the VPN connection request by referring the user information;
a second relay information accumulation processor configured to store address information indicating an address of the relay server device and device identification information specifying the VPN server device;
the authentication key transfer processor configured to establish a connection to the relay server device through the protocol by referring to the address information, and to request a connection to the VPN server device by transmitting the device identification information to the relay server device; and
a first connection reception processor configured to implement a VPN connection with the VPN server device.

3. The VPN connection system according to claim 2, wherein the authentication key transfer processor is configured to store a data table in which the device identification information and connection information indicating the established always-on connection are related to each other in the first relay information accumulation processor when the always-on connection is established, and
the relay server device further comprises:
a destination device authentication processor configured to acquire device identification information from the authentication key transfer processor, to perform matching between the acquired device identification information and the device identification information stored in the data table, to retrieve the connection information corresponding to the acquired device identification information from the data table when a result of the matching is matched, and to request a data transmission through the always-on connection based on the acquired connection information to the authentication key transfer processor, and
the authentication transfer processor is configured to transmit the client authentication data to the VPN server device through the always-on connection based on the acquired connection information.

4. The VPN connection system according to claim 3, wherein the first relay information accumulation processor stores search performance information which defines an interval and the number of times of the matching, and
the destination device authentication processor is configured to repeat the matching by the interval and the number of times defined by the search performance information when the acquired device authentication information is not found in the data table, and to determine the VPN connection request as bad when all results of the repeated matching is unmatched.

5. The VPN connection system according to claim 3, wherein the VPN server device comprises:
a third relay information accumulation processor configured to store address information indicating an address of the relay server device, connection authentication information used for a communication with the relay server device, and device identification information specifying the VPN server device, and
an authentication key reception processor configured to request a connection to the relay server device based on the address information stored in the third relay information accumulation processor, to transmit the connection authentication information stored in the third relay information accumulation processor to the relay server device when a request of the connection authentication information is received from the relay server device, to transmit the device identification information to the relay server device when the always-on connection with the relay server device is established, and to acquire the client authentication data from the relay server device.

6. The VPN connection system according to claim 5, wherein the VPN server device further comprises:
a second user information accumulation processor configured to store user information being an object of a connection authentication;
a client authentication processor configured to acquire the client authentication data from the authentication key reception processor, to perform an authentication based on the client authentication data by referring the user information stored in the second user information accumulation processor, and to register information indicating that a VPN connection with the client device is allowed to the second user information accumulation processor when the authentication based on the client authentication data is succeeded; and
a second connection reception processor configured to implement a VPN connection with the client device when the information indicating that a VPN connection with the client device is allowed is registered in the second user information accumulation processor.

7. The client device used for the VPN connection system according to claim 1.

8. The relay server device used for the VPN connection system according to claim 1.

9. The VPN server device used for the VPN connection system according to claim 1.

10. A VPN connection method comprising:
a VPN (Virtual Private Network) server device establishing an always-on connection with the relay server device through the protocol;
a client device generating a client authentication data in response to a VPN connection request;
a client server establishing a connection with the relay server through the protocol to transmit the client authentication data to the relay server by the client server;
the relay server using the always-on connection for relaying the transmitted client authentication data to the VPN server device when a connection is established with the client device;
the VPN server device performing an authentication of the client device based on the client authentication data;
the VPN server reporting a failure of a VPN connection to the client device when the authentication is failed; and
the VPN server implementing a VPN connection with the client device when the authentication is succeeded,
the relay server storing status information indicating whether an authentication data relay function is turned on or turned off and connection authentication information specifying the relay server device in a first relay information accumulation part;
the relay server requesting a VPN server device side connection authentication information to the VPN server device when the authentication data relay function is turned on and the device identification information is transmitted from the client device; and
the relay server establishing an always-on connection with the relay server device and the VPN server device through the protocol when the connection authentication information stored in the first relay information accumulation part and the VPN server device side connection authentication information is matched.

11. The VPN connection method according to claim 10, further comprising:
the client device storing user information being used for generating the client authentication data in a first user information accumulation part;
the client device generating the client authentication data in response to the VPN connection request by referring the user information;
the client device storing address information indicating an address of the relay server device and device identification information specifying the VPN server device in a second relay information accumulation part;
the client device establishing a connection to the relay server device through the protocol by referring to the address information in an authentication key transfer part included in the relay server device to request a connection to the VPN server device by transmitting the device identification information to the relay server device; and
the client device implementing a VPN connection with the VPN server device.

12. The VPN connection method according to claim 11, further comprising:

the relay server device storing a data table in which the device identification information and connection information indicating the established always-on connection are related to each other in the first relay information accumulation part when the always-on connection is established;
the relay server device acquiring the device identification information from the authentication key transfer part;
the relay server device performing matching between the acquired device identification information and the device identification information stored in the data table;
the relay server device retrieving the connection information corresponding to the acquired device identification information from the data table when a result of the matching is matched, and to request a data transmission through the always-on connection based on the acquired connection information to the authentication key transfer part; and
the relay server device transmitting the client authentication data to the VPN server device through the always-on connection based on the acquired connection information.

13. The VPN connection method according to claim 12, further comprising:
the relay server device storing search performance information which defines an interval and the number of times of the matching;
the relay server device repeating the matching by the interval and the number of times defined by the search performance information when the acquired device authentication information is not found in the data table; and
determining the VPN connection request as bad when all results of the repeated matching is unmatched.

14. The VPN connection method according to claim 12, further comprising:
the VPN server device storing address information indicating an address of the relay server device, connection authentication information used for a communication with the relay server device, and device identification information specifying the VPN server device;
the VPN server device requesting a connection to the relay server device based on the address information stored in the third relay information accumulation part;
the VPN server device transmitting the connection authentication information stored in the third relay information accumulation part to the relay server device when a request of the connection authentication information is received from the relay server device;
the VPN server device transmitting the device identification information to the relay server device when the always-on connection with the relay server device is established; and
the VPN server device acquiring the client authentication data from the relay server device by an authentication key reception part included in the VPN server.

15. The VPN connection method according to claim 14, further comprising:
the VPN server device storing user information being an object of a connection authentication in a second user information accumulation part;
the VPN server device acquiring the client authentication data from the authentication key reception part;
the VPN server device performing an authentication based on the client authentication data by referring the user information stored in the second user information accumulation part;

the VPN server device registering information indicating that a VPN connection with the client device is allowed to the second user information accumulation part when the authentication based on the client authentication data is succeeded; and the VPN server device implementing a VPN connection with the client device when the information indicating that a VPN connection with the client device is allowed is registered in the second user information accumulation part.

16. A computer program product embodied on a non-transitory computer-readable medium and comprising code that, when executed, causes a computer to perform the VPN connection method according to claim 10 and performed by the client device.

17. A computer program product embodied on a non-transitory computer-readable medium and comprising code that, when executed, causes a computer to perform VPN connection method according to claim 10 and performed by the relay server device.

18. A computer program product embodied on a non-transitory computer-readable medium and comprising code that, when executed, causes a computer to perform VPN connection method according to claim 10 and performed by the VPN server device.

* * * * *